US005727867A

United States Patent [19]

Johnstone

[11] Patent Number: 5,727,867

[45] **Date of Patent: *Mar. 17, 1998**

[54] CANOPY MOUNTING DEVICE FOR EXIT SIGNS AND THE LIKE

[75] Inventor: Robert M. Johnstone, Fairfield, Conn.

[73] Assignee: GSEG LLC, Farmington, Conn.

[ * ] Notice: The term of this patent shall not extend beyond the expiration date of Pat. Nos. 5,272,605 and 5,461,550.

[21] Appl. No.: 525,387

[22] Filed: Sep. 8, 1995

Related U.S. Application Data

[63] Continuation of Ser. No. 169,339, Dec. 17, 1993, Pat. No. 5,461,550, which is a continuation of Ser. No. 925,313, Jul. 27, 1992, Pat. No. 5,272,605, which is a continuation of Ser. No. 585,610, Sep. 20, 1990, abandoned.

[51] Int. Cl.[6] .......... F24S 1/02

[52] U.S. Cl. .......... 362/147; 362/368; 362/812

[58] Field of Search .......... 362/147, 226, 362/257, 368, 382, 404, 457, 458, 396, 812; 439/535, 536, 537; 40/570

[56] References Cited

U.S. PATENT DOCUMENTS

| | | | |
|---|---|---|---|
| 1,646,807 | 10/1927 | Benjamin . | |
| 1,933,358 | 10/1933 | Almcrantz . | |
| 3,086,308 | 4/1963 | Temouth | 362/812 |
| 3,798,584 | 3/1974 | Person | 339/14 |
| 3,886,349 | 5/1975 | Arai | 240/41 |
| 3,931,689 | 1/1976 | Shine | 40/132 |
| 4,273,957 | 6/1981 | Kolling, Jr. | 179/1 |
| 4,426,126 | 1/1984 | De Vos et al. | 339/125 |
| 4,449,168 | 5/1984 | Ewing | 362/404 |
| 4,507,719 | 3/1985 | Quiogue | 362/147 |
| 4,532,579 | 7/1985 | Merryman | 362/812 |
| 4,561,203 | 12/1985 | Mac Donald, Jr. et al. | 362/570 |
| 4,820,956 | 4/1989 | Slobodzian et al. | 362/226 |
| 5,018,290 | 5/1991 | Kozek et al. | 362/812 |
| 5,022,627 | 6/1991 | Beeghelli | 40/570 |
| 5,142,454 | 8/1992 | Green | 362/226 |
| 5,272,605 | 12/1993 | Johnstone | 372/147 |
| 5,461,550 | 10/1995 | Johnstone | 362/147 |

OTHER PUBLICATIONS

EXCITE installation Manal No. 60–972B.
DRAWING No. 1300323.
EXCITE canopy with nipple and two nuts.
EXCITE frame.
Lithonia QUANTUM ELM2 emergency lighting product (lamphead and portion of housing only) and Installation Instructions.
Dual-Lite EXCITE Exit Sign and Instructions for Installation, Operation and Service.
Copies of twenty-five photographs of an emergency lighting product of Emergi-Lite.
Lithonia Lighting 1981 brochure entitled "Snap-in Selector Module (LF-1)".
Lithonia Lighting 1983 brochure entitled "Snap-in Selector Module (LSS-2)".
Lithonia Lighting 1983 brochure entitled "Cable Combination (LCC-1)".

(List continued on next page.)

*Primary Examiner*—Y. My Quach
*Attorney, Agent, or Firm*—Ware, Fressola, Van der Sluys & Adolphson LLP

[57] ABSTRACT

In an exit sign, a canopy bracket has a pair of resilient spring fingers which are inserted through a central circular opening of a mounting plate mounted to a standard electrical box located in a wall or ceiling. The spring fingers temporarily secure the canopy bracket to the mounting plate this allowing an electrician to easily align and secure screws to the mounting plate, thereby greatly facilitating installation. The wires from the electrical box are extended through mounting plate and the canopy prior to securing the canopy to the mounting plate. Once secured, the user simply fits a hub portion of the canopy bracket telescopically within an opening with the exit sign housing. Spring capture barb members of the hub engage the housing to fixedly secure the exit sign to the wall or ceiling. Then the user connects the wires extending from the canopy bracket to those in the exit sign.

15 Claims, 4 Drawing Sheets

OTHER PUBLICATIONS

AMP Incorporated 1979 brochure entitled "Flexible Conduit Connectors".

AMP Incorporated 1979 drawing entitled "Connector Assembly, 3/8×90°; Flexible Conduit".

Lithonia Lighting Reloc branch snap–in selector module with cable and electrical plate with standard size knockout.

Flexible cable/electrical fixture adapter with a length of flexible conduit.

CANOPY MOUNTING DEVICE FOR EXIT SIGNS AND THE LIKE

This is a continuation of application Ser. No. 08/169,339 filed Dec. 17 1993, now U.S. Pat. No. 5,461,550, which is a continuation of Ser. No. 07/925,313.

BACKGROUND OF THE INVENTION

The present invention relates generally to mounting electrical devices to standard electrical junction boxes found in walls and ceilings and, more particularly, to mounting illuminated exit signs to such electrical boxes.

Under current local fire and building codes, buildings to which the public has access are required to have signage therein identifying the exits. Most of these signs are required to exhibit a specific amount of illumination and, oftentimes, must have an emergency backup power source to provide emergency illumination for a specified period of time during periods when utility power to the building is discontinued, thereby facilitating egress of persons from the building.

Traditionally, two 15-watt incandescent lamps driven by 120 volt alternating current (120 VAC) have been employed to provide normal illumination while two 3.6-watt incandescent lamps driven by a self contained emergency battery power supply are used for illumination during power failure situations. A switching or transfer device will automatically operate the emergency backup illumination system when a power failure is detected.

While these traditional exit sign lighting arrangements perform adequately, they do have a few drawbacks. A major drawback is the length of time necessary for an electrical contractor to install each sign. Oftentimes, the electrical contractor will take thirty (30) minutes or more to install a single exit sign. In addition, the installation procedure may be difficult, requiring at least two persons.

It is an object of the present invention to provide a novel exit sign mounting which allows the exit sign to be temporarily fastened to the electrical box pending final installation thereof.

It is also an object to provide such a device having a canopy which covers the electrical box and has a snap interconnection hub allowing expedited fastening of the exit sign thereto.

Still another object is to provide such a device which can be used to install an exit sign in five (5) minutes or less.

A further object is to provide such an exit light mount which may be readily and economically fabricated and will enjoy a long life in operation.

SUMMARY OF THE INVENTION

It has now been found that the foregoing and related objects can be readily attained in an exit sign adapted to be connected to an electrical box located in a wall or ceiling. The exit sign includes a canopy bracket adapted to cover the electrical box, a universal mounting plate for providing connection of the canopy bracket to the electrical box and an exit sign housing connected to the canopy bracket. A pair of cantilevered resilient finger members on the canopy bracket are used to temporarily fasten the mounting plate and the canopy bracket while permitting relative rotative movement between them for aligning a pair of captured screw fasteners during final installation of the canopy bracket on the mounting plate. An interconnection assembly is dimensioned for flexible latching cooperation between the canopy bracket and the exit sign housing.

Desirably, the mounting plate has an aperture defined therein and the resilient finger members of the canopy bracket are dimensionally sized to interfit within the aperture and temporarily hold the canopy bracket and mounting plate in assembly pending installation of the captured screw fasteners. The resilient finger members have spaced-apart ends dimensionally sized and placed so as to bias the resilient finger members as they are inserted in the aperture. The spaced-apart ends have tab end portions which provide both the biasing action to the resilient finger members as the resilient finger members are inserted in the aperture and a snap-fit engagement of the resilient finger members to temporarily hold the canopy bracket and the mounting plate in assembly pending final installation thereof.

According to the invention, the interconnection assembly includes a hub on the canopy bracket cooperating with the exit sign housing with an opening having an elongated side wall. The hub is dimensionally sized to interfit within the opening. The elongated side wall has at least one locking barb receptacle opening, each sized to receive a locking barb member of the hub. Each locking barb member is a flexible member adapted to snap-fit into its associate locking barb receptacle.

Conveniently, the hub and elongated side wall are provided with appropriate anti-rotation keying to prevent relative rotation between the canopy and the exit sign housing. The anti-rotation keying is provided by at least one rib on the hub which mates with a groove defined in the elongated side wall.

To take into account dimensional irregularities, the canopy bracket and the exit sign housing are dimensionally sized so as to place the interconnection assembly under tension when assembled. The tensioning is achieved by providing the canopy bracket with abutment edges which engage the exit sign housing.

The invention will be fully understood when reference is made to the following detailed description taken in conjunction with the accompanying drawings.

DETAILED DESCRIPTION OF THE PREFERRED EMBODIMENT

Figure 1:
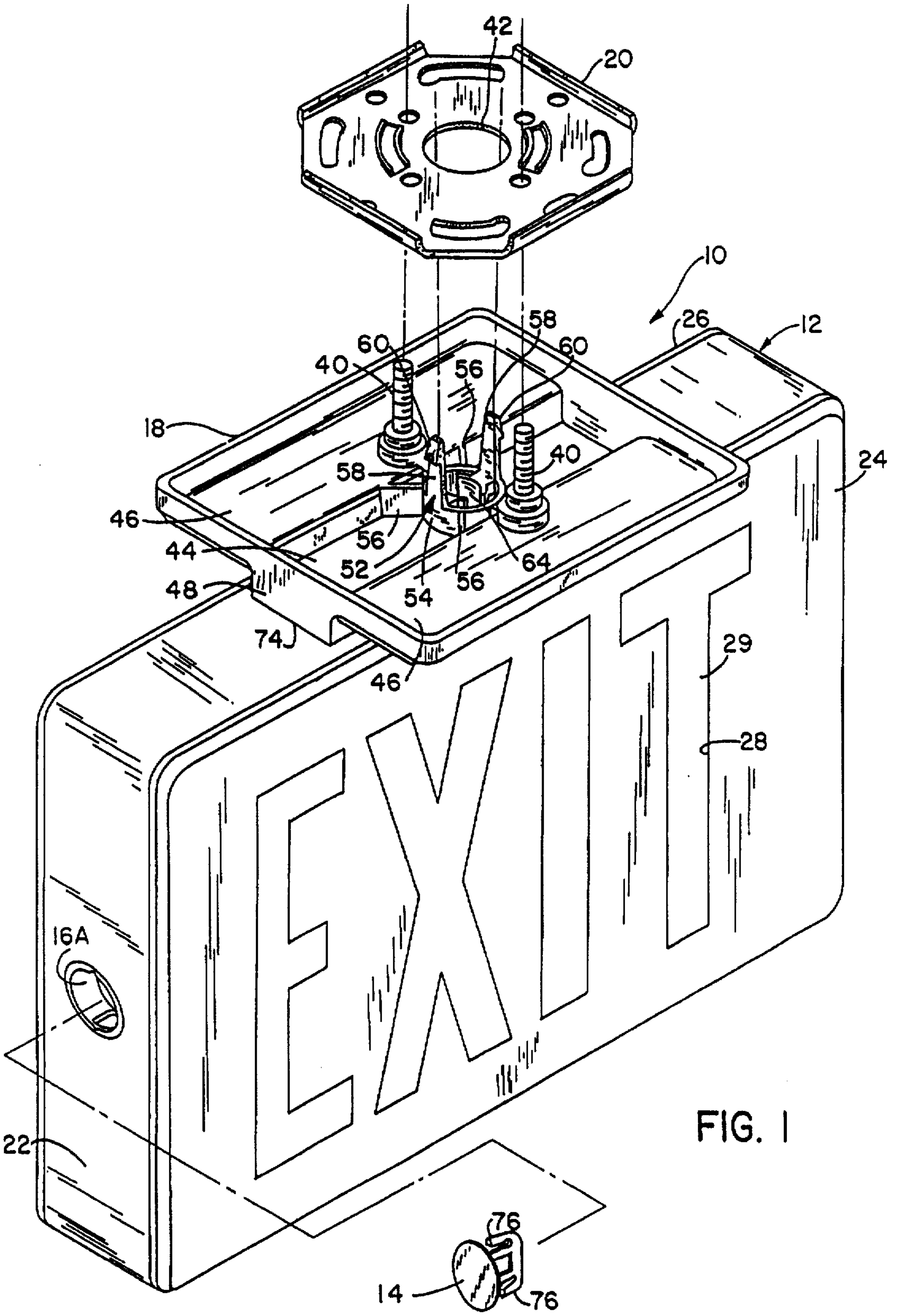
FIG. 1 is a partially exploded perspective view of an exit sign embodying the present invention.

Referring first to FIG. 1 of the drawings, therein illustrated is the exit sign construction of this invention generally designated by the numeral 10. The exit sign 10 has an exit sign housing generally indicated by the numeral 12 shown with a flush mounted hole plug 14 mountable to the side thereof in elongated opening 16A, a canopy bracket 18 mounted to the top of the exit sign housing 12, and a universal mounting plate 20 mountable to both the canopy bracket 18 and a standard electrical junction box in a manner explained further hereinafter. With this arrangement, the exit sign construction of this invention can be mounted directly to a standard electrical junction box found in a ceiling of a building in any desired location.

The exit sign housing 12 comprises a central rectangularly shaped frame 22 with front and back cover members 24 and 26, at least one of which incorporates a large stencil 28 having the letters "EXIT" in the major surface thereof and a colored plastic diffuser 29 therebehind. The central rectangularly shaped frame 22 and the front and back cover members 24 and 26 are snap-fit together and cooperate to form an enclosure 30 (FIG. 2) for the necessary electrical lighting components such as low voltage lamps 32 and lamp sockets 34 (one of each shown in FIG. 2) as well as appropriate wiring, transformers and auxiliary power supplies (all not shown).

Figures 2, 3, 4:
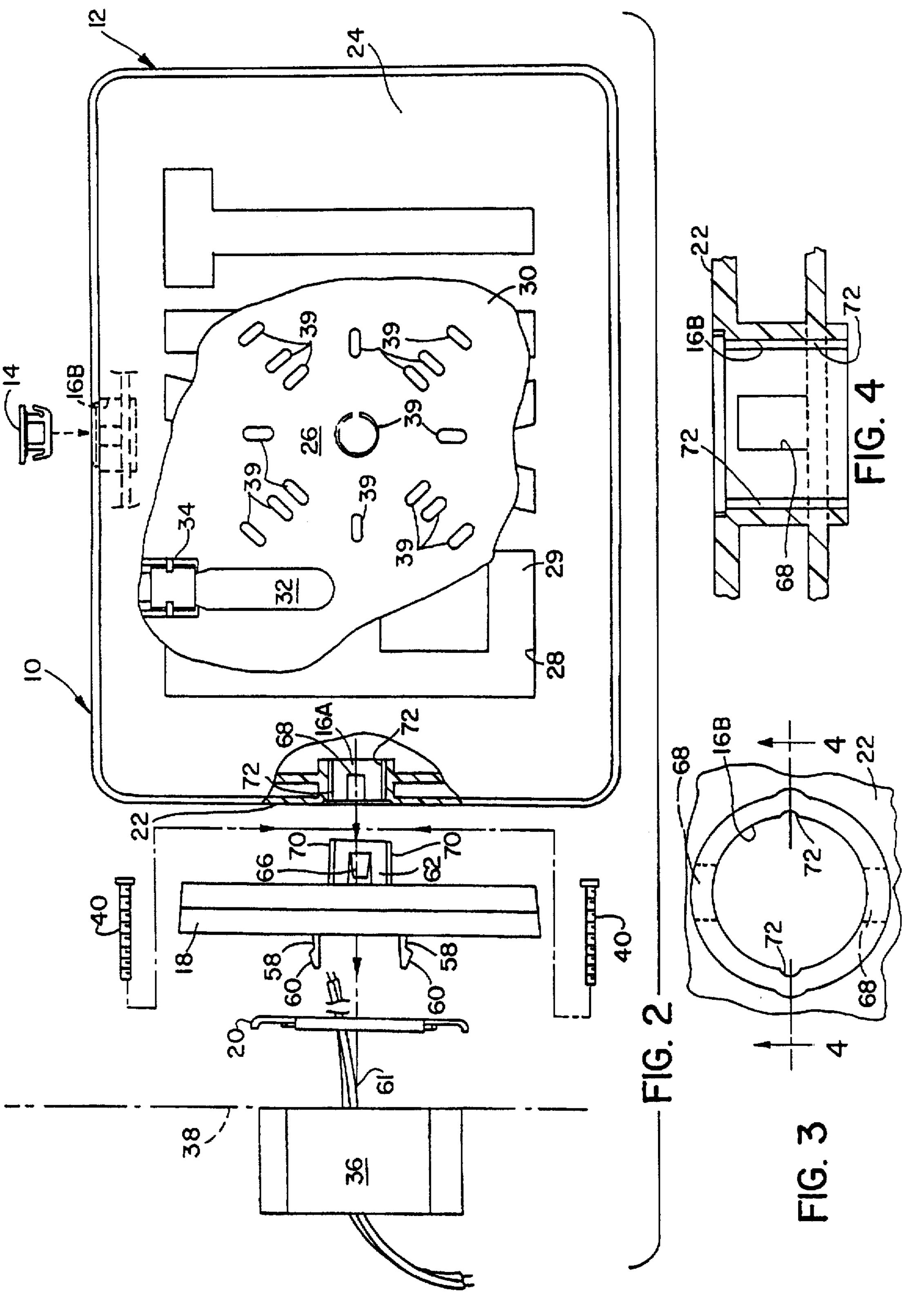
FIG. 2 is an exploded side elevational view of the exit sign and its associated electrical box with a portion of one of the housing members broken away to illustrate internal structure.
FIG. 3 is a partial top elevational view of the exit sign housing showing the opening in the housing frame sized to accept the hub assembly of the canopy bracket or a flush mounted hole plug.
FIG. 4 is a cross-sectional view taken along the 4—4 line of FIG. 3.

In the alternative arrangement of the exit sign construction of this invention shown in FIG. 2, the flush mounted hole plug 14 can be mounted to the top of the housing 12 within an elongated opening 16B defined in the rectangularly shaped frame 22, while the canopy bracket 18 is mounted to the side of the central rectangularly shaped frame 22 within the elongated opening 16A. With this arrangement, the exit sign construction of this invention can be mounted directly to an electrical junction box 36 located in a side wall 38 of a building in any desired location.

In addition to the two previously mentioned mounting arrangements using the canopy bracket 18, another nonillustrated arrangement can be used where the exit sign unit of the present invention can be adapted for flush mounting on a side wall directly to the electrical junction box 36. By eliminating the canopy bracket 18 and using a screwdriver to punch out the areas of weakness 39 in the back cover member 26, the back cover member 26 can be attached directly to the electrical junction box 36 by appropriate fasteners such as screws (not shown) and appropriate wires can be threaded through the back cover member 26. A pair of the flush mounted hole plugs 14 can then be inserted in the elongated openings 16A and 16B.

Figure 6:
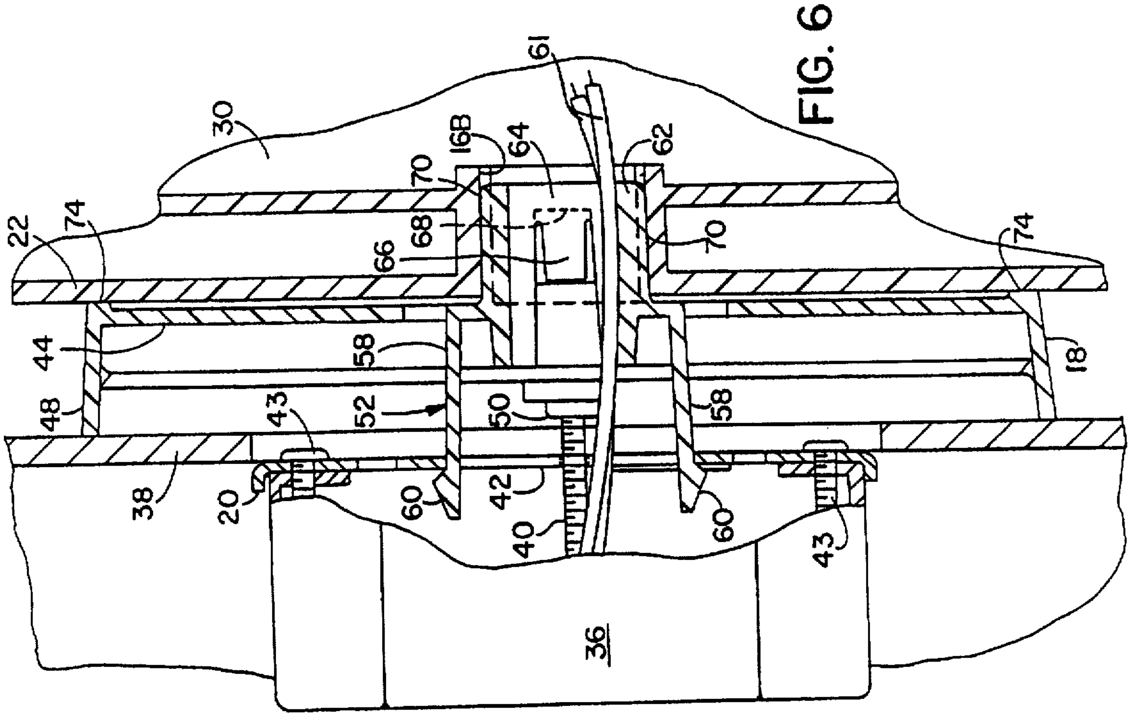
FIG. 6 is a partial side elevational view in partial cross section showing the assembled exit sign mounting device.
Figure 5:
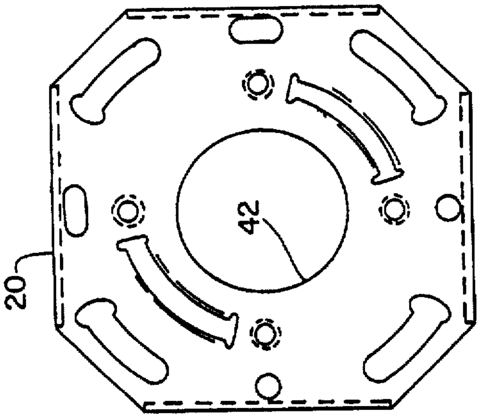
FIG. 5 is a top elevational view of the universal mounting plate.

As best seen in FIGS. 1 and 5, the mounting plate 20 typically known as a universal mounting plate, is provided with a pattern of apertures adapting it to be mounted to virtually every type of electrical junction box, whether square or cutoff corner. These apertures also provide threaded receptacles for retention of a pair of screws 40 captured in the canopy bracket 18. The mounting plate 20 has a central circular opening 42 having a diameter of 1.5 inches (3.8 cm) and can be attached to the electrical junction box 36 by means of screw fasteners 43 as shown in FIG. 6.

Figure 7:
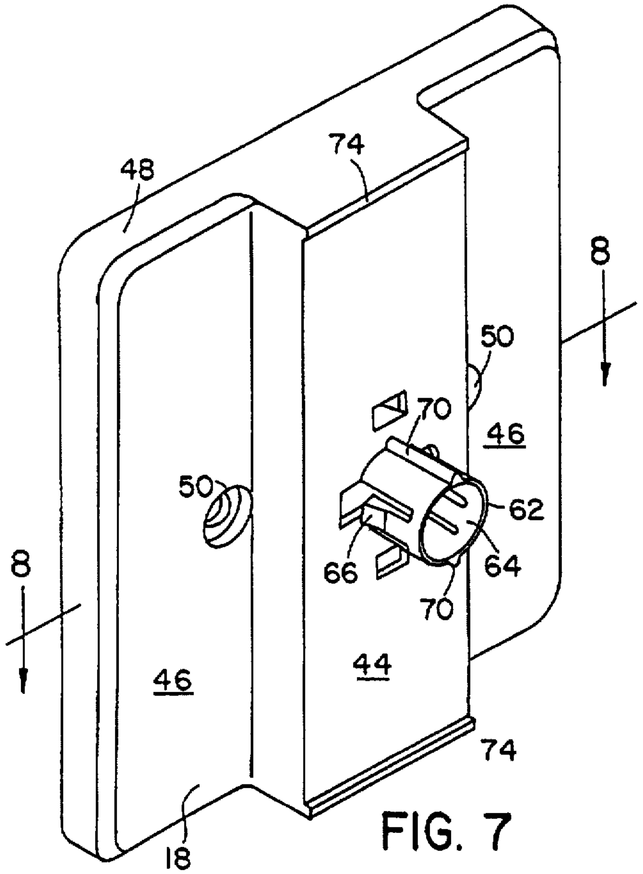
FIG. 7 is a perspective view of the canopy bracket of the present invention.
Figure 8:
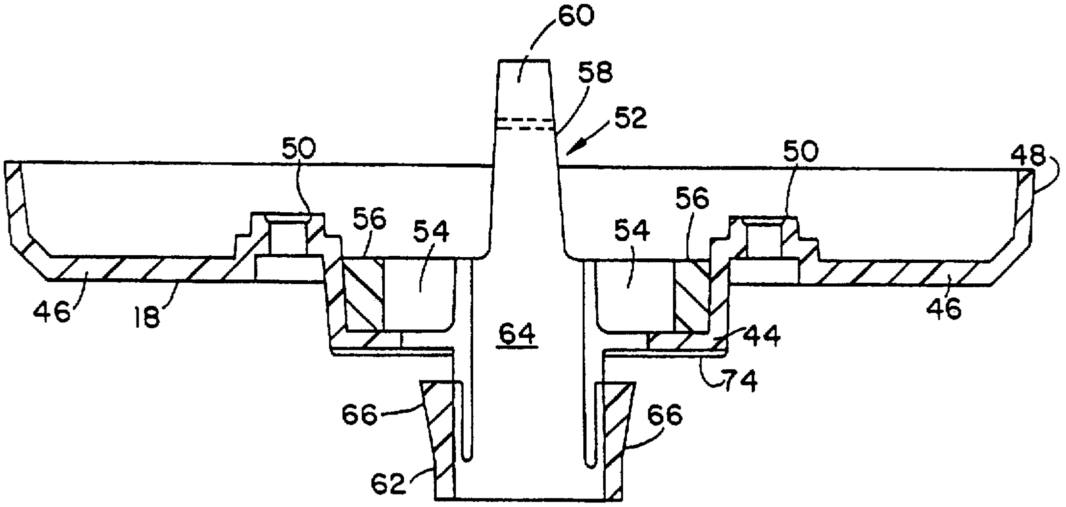
FIG. 8 is a cross-sectional view taken along the 8—8 line of FIG. 7.

Turning now to the canopy bracket 18 shown in FIGS. 1, 7 and 8, it has a central landing portion 44 and two lower profile extending wing portions 46 surrounded by an outer flange 48 running around the periphery thereof and designed to fit flush against the associated ceiling or wall. The wing portions 46 include threaded screw housings 50 in which the screws 40 are threadingly located.

Located on the central land portion 44 of the canopy bracket 18 is a canopy mounting device generally indicated by numeral 52 for temporarily fastening the canopy bracket 18 to the mounting plate 20. The canopy mounting device 52 includes a circular retaining wall 54 having six supporting ribs 56 extending outwardly therefrom and a pair of cantilevered resilient spring fingers 58 extending upwardly therefrom. The resilient spring fingers 58 are dimensionally sized and placed so as to resiliently interfit in the central circular opening 42 of the mounting plate 20. The resilient spring fingers 58 have tab end portions 60 which provide both a biasing action to them as they are inserted in the central circular opening 42 and a snap-fit engagement of the resilient spring fingers 58 within the central circular opening 42 once inserted. Through the snap-fitting arrangement, the canopy bracket 18 is thus temporarily held in assembly with the mounting plate 20. To complete the installation of the canopy bracket 18 on the mounting plate 20, the canopy bracket 18 is turned or rotated so as to align the pair of captured screws 40 with appropriate holes in the mounting plate 20. The pair of captured screws 40 are used to then permanently secure the canopy bracket 18 to the mounting plate 20. It should be noted that the user, prior to final installation of the canopy bracket 18 to the mounting plate 20, will pull the electrical wires 61 from the electrical junction box 36 through the central circular opening 42 and through a central orifice 64 of the canopy.

As can be seen in FIGS. 2, 7 and 8, the canopy bracket 18 incorporates a protruding hub assembly 62 which defines the central orifice 64 for the passage of electrical wires 61. The hub assembly 62 is dimensionally sized to interfit with the elongated openings 16A and 16B and has a pair of opposed resilient spring barb members 66. Each resilient spring barb members 66 is designed for snap-fit interconnection with a locking barb receptacle opening 68 (note FIGS. 3 and 4) found on opposite sides of both the elongated openings 16A and 16B. The outside surface of the resilient spring barb members 66 has a pair of opposed rib members 70 dimensionally sized to interfit with mating grooves 72 found within the elongated openings 16A and 16B, thereby providing an anti-rotation keying device to prevent rotation between the canopy bracket 18 and the exit sign housing 12. As best seen in FIG. 6, the central landing portion 44 of the canopy bracket 18 includes abutment edges 74 at either end thereof dimensionally sized to engage the central rectangularly shaped frame 22 to place a loading force on the interconnection between the resilient spring barb members 66 of the hub assembly 62 and the locking barb receptacle openings 68 of the elongated openings 16A or 16B to take up play caused by any dimensional irregularities therebetween. Accordingly, the canopy bracket 18 is fixedly secured to the central rectangularly shaped frame 22.

Thus during installation, once the canopy bracket 18 is secured to the mounting plate 20, the user simply inserts the hub assembly 62 in either elongated opening 16A or 16B depending on the desired type of mounting (wall or ceiling) thereby securing the exit sign housing 12 to the wall or ceiling when the resilient spring barb members 66 cooperate with the locking barb receptacle openings 68. The electrical wires 61 from the electrical junction box 36 pass through orifice 64 in the canopy bracket 18 and the chosen elongated opening 16A or 16B. These wires 61 would then be attached to appropriate electrical wiring (not shown) within the exit sign housing 12 to power the exit sign 10.

Figure 9:
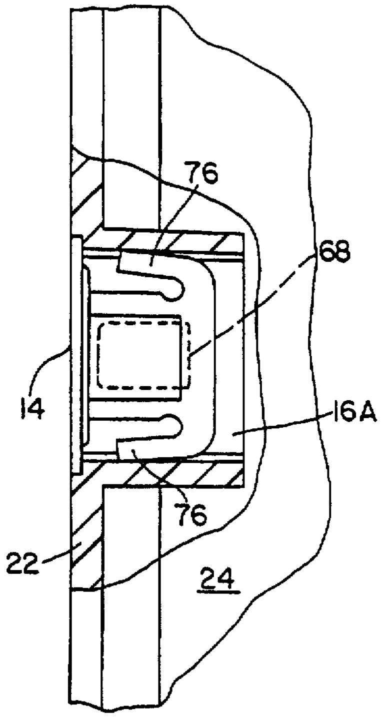
FIG. 9 is a side elevational view of a portion of the housing with a portion broken away to illustrate the placement of the flush mounted hole plug.

Turning finally to FIG. 9, the details of the flush mounted hole plug 14 can be observed. When the ceiling or wall mounting is chosen, the remaining elongated opening 16A or 16B can be closed by utilizing the flush mounted hole plug 14. The resilient hook members 76 on the flush mounted hole plug 14 are aligned with and force fit within the mating grooves 72 of the chosen elongated bayonet openings 16A or 16B to hold the flush mounted hole plug 14 snugly therein. If the areas of weakness 39 on the back cover member 26 (FIG. 2) are used to flush mount the exit sign on a wall, then both elongated openings 16A and 16B can be filled with a flush mounted hole plug 14.

The mounting plate 20 is preferably stamped from corrosion-resistant sheet metal alloy material such as galvanized steel. The canopy bracket 18, exit sign housing 12 and the hole plug 14 are preferably molded from a plastic resin such as an engineering type thermoplastic like ABS, polycarbonate or polyphenylene oxide but it should be apparent to those skilled in the art that they may be manufactured from other suitable materials which exhibit the desired resiliency to permit the desired flexing movement of the various elements.

It will therefore be seen from the above that the present invention provides an effective means for facilitating installation of an exit sign to a standard electrical junction box found in a wall or ceiling. It should be appreciated that the mounting device described herein can be used to connect electrical fixtures other than exit signs to electrical junction boxes.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the invention which, as a matter of language, might be said to fall therebetween.

What is claimed is:

1. A mounting device to facilitate connection of an electrical fixture to an electrical box recessed in an opening in a wall or ceiling comprising:

(a) a canopy for the electrical fixture adapted to completely cover the opening for the electrical box;

(b) means providing connection of said canopy to the electrical box;

(c) a housing for the electrical fixture; and (d) means interconnecting said canopy and said housing of the electrical fixture, said interconnecting means includes:

(i) a hub on one of said canopy and said housing, (ii) the other of said canopy and said housing having an opening defined in an elongated wall, said hub dimensionally sized to interfit within said opening defined in said elongated wall, and (iii) one of said hub and said elongated side wall having at least one aperture with a flexible barb member therein, said flexible barb member being dimensionally sized to deflect upon insertion of said hub into said opening defined in said elongated wall and to retain said canopy and said housing in assembly.

2. A mounting device in accordance with claim 1, wherein said hub and said elongated wall are provided with anti-rotation keying means to prevent relative rotation between said canopy and said housing.

3. A mounting device in accordance with claim 2, wherein said anti-rotation keying means is at least one rib on one of said hub and said elongated wall and a mating groove defined in the other of said hub and said elongated wall.

4. A mounting device in accordance with claim 1, wherein electrical wiring for the electrical fixture extends through said hub and said opening defined in said elongated wall.

5. A mounting device in accordance with claim 1, wherein said canopy and said housing are dimensionally sized so as to place said interconnection means under tension when assembled.

6. A mounting device in accordance with claim 5, wherein said canopy has abutment edges which engage said housing, thereby placing said interconnection means under tension.

7. A mounting device in accordance with claim 1, wherein the other of said hub and said elongated wall has at least one barb receptacle opening sized to receive said flexible barb member to retain said canopy and said housing in assembly.

8. A mounting device in accordance with claim 7, wherein said flexible barb member is adapted to snap-fit into its associated barb receptacle opening.

9. A mounting device in accordance with claim 1, wherein said flexible barb member is cantilevered, said cantilevered flexible barb member is dimensionally sized to flex to resist removal of said housing from said canopy by increasing the amount of flexible latching cooperation between said housing and said canopy.

10. A mounting device in accordance with claim 9, wherein said cantilevered flexible barb member is thicker at its free end than at its base end.

11. A mounting device in accordance with claim 1, wherein said hub has a base end attached to said canopy and a free end spaced from said canopy, said aperture for said flexible barb member is defined in said hub and said flexible barb member extends into its associated aperture from adjacent the free end of said hub toward the base end thereof.

12. A mounting device in accordance with claim 11, wherein said flexible barb member is cantilevered and extends into its associated aperture.

13. A mounting device in accordance with claim 12, wherein said cantilevered flexible barb member is thicker at its free end than at its base end.

14. A mounting device in accordance with claim 11, wherein said flexible barb member is cantilevered, said cantilevered flexible barb member is dimensionally sized to flex to resist removal of said housing from said canopy by increasing the amount of flexible latching cooperation between said housing and said canopy.

15. A mounting device in accordance with claim 14, wherein said cantilevered flexible barb member is thicker at its free end than at its base end.

* * * * *

UNITED STATES PATENT AND TRADEMARK OFFICE

CERTIFICATE OF CORRECTION

PATENT NO. : 5,727,867

DATED : March 17, 1998

INVENTOR(S) : Robert M. Johnstone

It is certified that error appears in the above-identified patent and that said Letters Patent is hereby corrected as shown below:

In column 5, line 54, "side" should be deleted.

Signed and Sealed this

Fourteenth Day of September, 1999

Attest:

Q. TODD DICKINSON

*Attesting Officer*

*Acting Commissioner of Patents and Trademarks*